July 16, 1963 B. BARÉNYI 3,097,878
AUTOMOBILE BODY AND DOOR CONSTRUCTION
Filed July 13, 1959 3 Sheets-Sheet 1
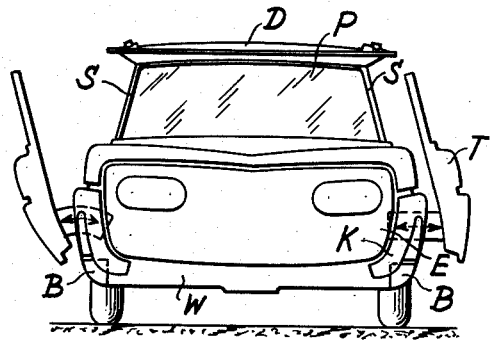
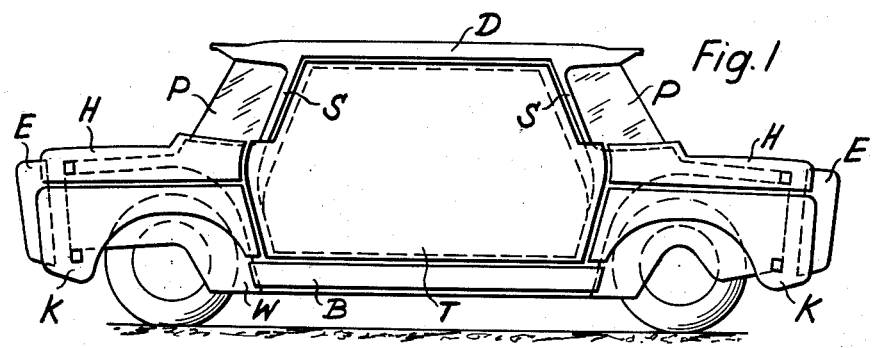
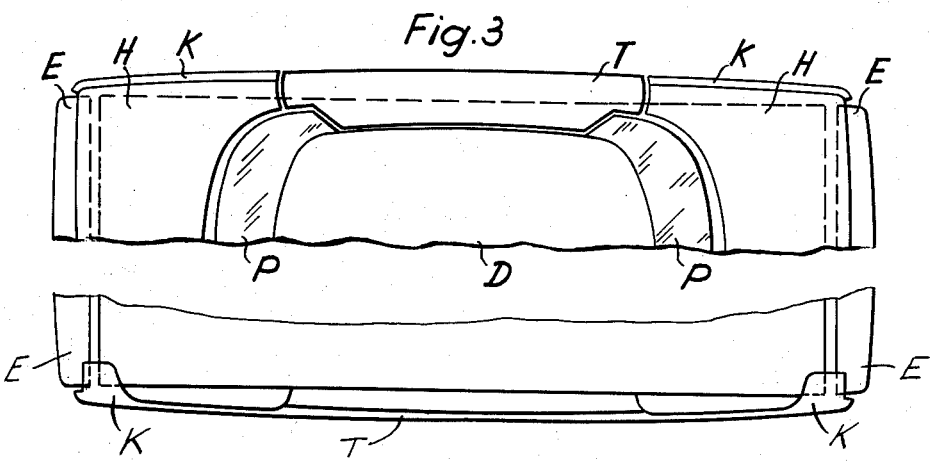
INVENTOR.
BÉLA BARÉNYI
BY
Dicke, Craig and Freudenberg
ATTORNEYS July 16, 1963      B. BARÉNYI      3,097,878

AUTOMOBILE BODY AND DOOR CONSTRUCTION

Filed July 13, 1959      3 Sheets-Sheet 2

INVENTOR.
BÉLA BARÉNYI
BY
Dicke, Craig and Freudenberg
ATTORNEYS

July 16, 1963  B. BARÉNYI  3,097,878
AUTOMOBILE BODY AND DOOR CONSTRUCTION

Filed July 13, 1959

INVENTOR.
BÉLA BARÉNYI
BY
Dicke, Craig and Freudenberg
ATTORNEYS

United States Patent Office 3,097,878
Patented July 16, 1963

3,097,878
AUTOMOBILE BODY AND DOOR CONSTRUCTION
Béla Barényi, Stuttgart-Vaihingen, Germany, assignor to Daimler-Benz Aktiengesellschaft, Stuttgart-Unterturkheim, Germany
Filed July 13, 1959, Ser. No. 826,578
Claims priority, application Germany July 16, 1958
2 Claims. (Cl. 296—28)

The present invention relates to an automobile construction, and more particularly to a passenger car with a closed upper body and doors therein, and to the particular design and construction of such a body and doors in their relation to each other.

It is an object of the present invention to provide a door structure for a passenger car in which each of the substantially vertical edges of the car door is separated into two or more parts which are offset relative to each other and to the automobile, and in which the edge portion connecting the two substantially vertical parts extends substantially horizontally.

A further object of the invention consists in designing the body and door structure so that all of the horizontal joints which are noticeable from the outside between the door and the adjacent body portions are of angular or steplike shape.

The present invention produces the great advantage that the installation of the door will be considerably simplified, since minor inaccuracies in the shape of the door and the adjacent body parts will now be practically unnoticeable, whereas in previous door constructions such inaccuracies had to be carefully eliminated by complicated and expensive refinishing operations in order to attain a proper fit of the door. This is primarily due to the fact that, according to the invention, the outer surfaces of the adjacent parts of the door and the car body are not disposed within the same plane at least at those joints along the door which are always the most noticeable, namely, the horizontal joints.

It is a further object of the invention also to make the other joints between the adjacent surfaces of the door and the car body wholly or partly of an angular or steplike shape, particularly that part of the vertical joint underneath the mentioned horizontal edge portion.

The present invention is applicable with the greatest advantage particularly to a sliding door, the two sides of which are symmetrical relative to the central vertical plane thereof, and which may be opened by first being moved outwardly from the car body and out of the door opening and then either forwardly or rearwardly along the car body in a direction substantially parallel to the outer walls thereof.

Further objects, features, and advantages of the present invention will become apparent from the following detailed description thereof, particularly when read with reference to the accompanying diagrammatical drawings, in which—

FIGURE 1 shows a side view of a passenger car according to the invention with two different door opening means;

FIGURE 2 shows a front view thereof;

FIGURE 3 shows somewhat diagrammatically a top plan view and FIGURE 3a shows a bottom plan view of the car according to FIGURES 1 and 2;

FIGURES 4 to 7 show side views of four different modifications of the car doors according to the invention; while

Figure 4:
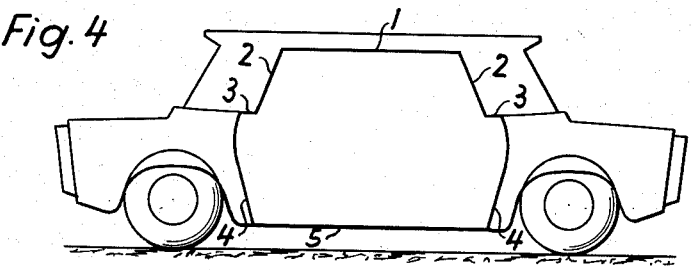

Referring to the drawings, the car body according to the invention essentially consists of a frame W, four fenders K, two end walls E, two hoods H, four columns or posts S, front and rear panorama windshields P, a car top D, and two doors T. The doors T preferably form sliding doors and the two halves of each door are preferably symmetrical relative to the central vertical plane thereof. Underneath doors T a cover strip B may be mounted on the frame W so as to be either permanently or removably secured thereto.

Figure 5:
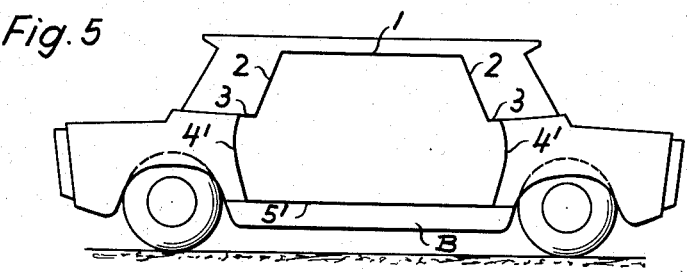

Along its two substantially vertical edges, each door T is designed so that each of these edge portions is divided substantially at the center of the total height of the door and the upper and lower edge portions are laterally and transversely offset relative to each other and the intermediate edge portion extends substantially horizontally. Thus, as illustrated particularly in FIGURES 4 and 5, between each door and the adjacent body parts eight joints will be formed, namely, a joint 1 between the horizontal upper edge of the door and the car top D, a pair of joints 2 between the upper edge portions at the front and rear ends of the door and the posts S supporting the top D, the two short horizontal joints 3 between the mentioned horizontal edge portion at the front and rear ends of the door and the adjacent parts of the body, a pair of joints 4 between the lower edge portions at the front and rear ends of the door and the adjacent edges on the lower car body, and a joint 5 between the horizontal lower edge of the door and the frame. In the embodiment according to FIGURE 4, this joint 5 is covered and not visible from the outside, while in FIGURE 5 the door opening is reduced in height by the provision of a cover strip B so that joints $4^1$ will also be shortened and the lower horizontal joint $5^1$ will be visible.

Figure 6:
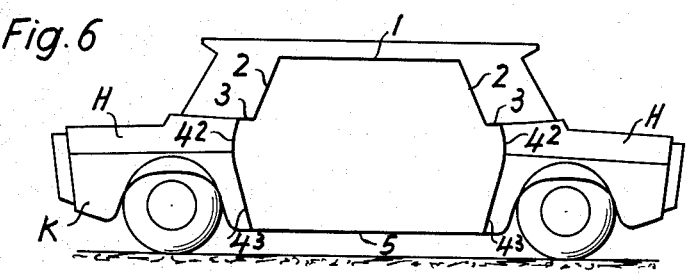
Figure 7:
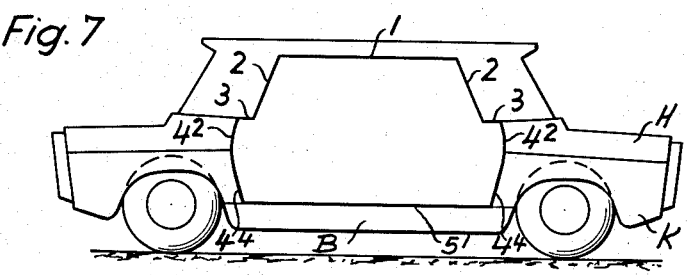

In the embodiments according to FIGURES 6 and 7, each of the substantially vertical joints underneath the horizontal joints 3 is once more divided since each fender K is separated from the respective hood H by another horizontal joint. The upper part of this vertical joint adjacent to joint 3 is indicated in FIGURES 6 and 7 at $4^2$. In the embodiment according to FIGURE 6, in which, similarly as in FIGURE 4, the lower horizontal joint 5 is covered, the lower part of each vertical joint 4 is indicated at $4^3$, while in the embodiment according to FIGURE 7 in which the height of the door opening is shortened by the cover strip B, the lower part of each vertical joint 4 is indicated at $4^4$. Thus, in these two last mentioned embodiments there will be ten joints between the door and the adjacent body portions.

FIGURES 8 to 16 illustrate various other designs of the mentioned joints between the door and the adjacent body portions.

Figure 8:
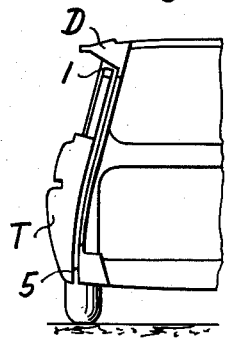
FIGURES 8 to 16 show similar vertical transverse cross sections of nine different modifications of a car door and the adjacent body portions of the car according to the invention.
Figure 9:
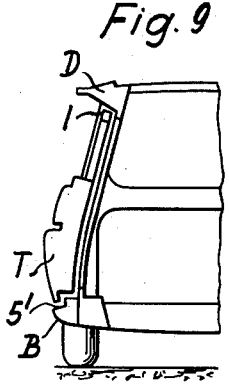
Figure 10:
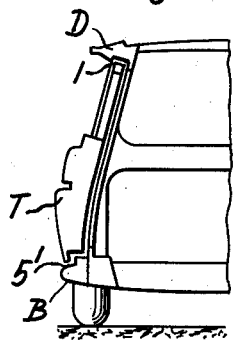

In the embodiment according to FIGURE 8, the upper horizontal joint 1 between door T and the car top D is made of an angular shape, and the lower horizontal joint 5 is covered. According to the modification shown in FIGURE 9, however, the lower horizontal joint $5^1$ is step-shaped since the cover strip B projects outwardly beyond the outer surface of door T. The lower edge of the door T includes a lip-like projection which may be integral with the door and of less width than the door adapted to be received in a complementary recessed area in the cover strip B. FIGURE 10 illustrates another modification in which an inwardly facing step configuration forming a recess is provided at the upper horizontal joint 1 between door T and the top D.

Figure 11:
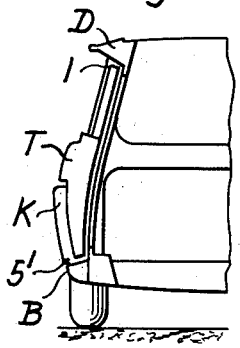
Figure 12:
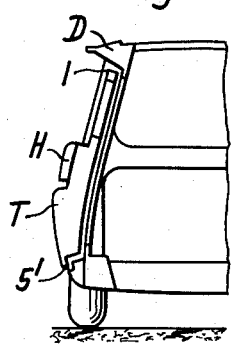
Figure 13:
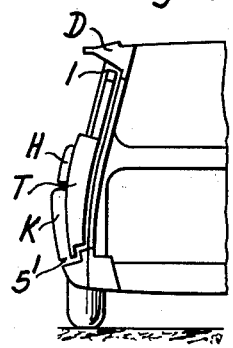

FIGURES 11 to 16 indicate the shape of the vertical joints $4^2$, $4^3$, and $4^4$ as illustrated in FIGURES 6 and 7. According to FIGURE 11, the fenders K project from the lower part of door T at the joint $4^4$ and are thus transversely offset relative thereto. In FIGURE 12, hoods H project at joints 4² from door T, while in FIGURE 13, the fenders K as well as hoods H project from door T so that the joints 4² and 4⁴ will be angular or step-shaped. In all three embodiments according to FIGURES 11 to 13, the lower horizontal joint 5¹ is visible from the outside and likewise of an angular or steplike shape.

Figure 14:
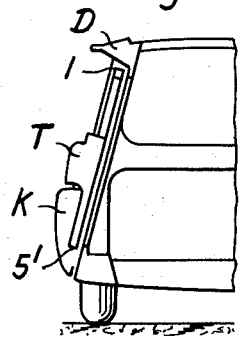

The further modification according to FIGURE 14 differs from the embodiment according to FIGURE 11 primarily by the fact that the cover strip B underneath the door T is omitted, while the adjacent parts are still disposed at an angular relation to each other at the lower vertical joint 5¹.

Figure 15:
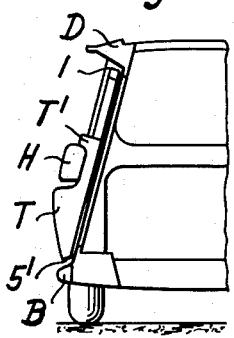
Figure 16:
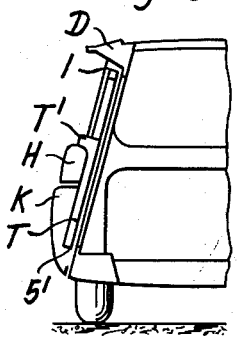

In the modification according to FIGURE 15, the central horizontal joint 3 of door T is provided with a collar T' which extends up to the level of hood H. Underneath this collar T', the outer surface of the door recedes so that hood H projects therefrom outwardly. At the lower part of door T, however, the outer surface thereof is in alignment with the outer surface of fender K. Finally, in the modification according to FIGURE 16, door T is likewise provided with a collar T' and recedes underneath the latter to form an outer surface which extends at least horizontally in a straight direction, while hood H and fender K project outwardly therefrom.

As diagrammatically indicated in FIGURE 2 at the left and right sides thereof, the door T may be opened by first shifting or pivotig the same outwardly and out of the door opening by suitable connecting means, and by then sliding it either forwardly or rearwardly on these connecting means along the car body in a spaced relation and in a direction substantially parallel to the outer walls thereof. Such connecting means may be of the type shown in my Patent No. 2,992,851 of July 18, 1961, entitled "Sliding Door for Motor Vehicles."

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a passenger car having a closed upper body including a plurality of outer body parts, at least one sliding door mounted in said body and having an outer surface with edge portions thereof noticeably and intentionally offset from adjacent outer body parts of said body forming joints including separating gaps between said door and said adjacent outer body parts of said body, means enabling an initial outward transverse movement of said door and a subsequent sliding movement of said door in the longitudinal direction of said car to an open position, upper and lower vertical joints at each side of said door being interconnected at a point approximately corresponding to the midpoint of the height of said door by an intermediate substantially horizontally extending joint, each intermediate substantially horizontally extending joint being formed by edge portions of said door and of said adjacent outer parts noticeably offset in the transverse direction of the car with respect thereto, and all of said horizontal joints around said door that are visible from the outside of said car being of an angular shape as viewed in transverse vertical planes through said body, the above described construction of said joints including the intentional offset of said outer surface of said door relative to said outer body parts being effective to facilitate assembly of the car and to render minor irregularities in the size of the respective elements less discernible.

2. In a passenger car having a closed upper body including a plurality of outer body parts, at least one sliding door mounted in said body and having an outer surface with edge portions thereof noticeably and intentionally offset from adjacent outer body parts of said body forming a plurality of essentially vertical joints and a plurality of essentially horizontal joints, said joints including separating gaps between said door and said adjacent outer body parts of said body, means enabling an initial outward transverse movement of said door and a subsequent sliding movement of said door in the longitudinal direction of said car to an open position, said joints being formed by said edge portions of said outer surface of said door being substantially transversely offset with respect to said adjacent outer body parts, and all of said joints around said door that are visible from the outside of said car being of an angular shape as viewed in transverse vertical planes through said body, the above described construction of said joints including the intentional offset of said outer surface of said door relative to said outer body parts being effective to facilitate assembly of the car and to render minor irregularities in the size of the respective elements less discernible.

References Cited in the file of this patent

UNITED STATES PATENTS

| | | |
|---|---|---|
| 1,113,214 | Hershey | Oct. 13, 1914 |
| 1,928,523 | Bally | Sept. 26, 1933 |
| 2,240,022 | Saives | Apr. 29, 1941 |
| 2,680,645 | Brill | June 8, 1954 |
| 2,699,355 | Kavanaugh | Jan. 11, 1955 |
| 2,860,911 | Cotter | Nov. 18, 1958 |
| 2,886,373 | Barényi | May 12, 1959 |
| 2,955,872 | Barényi | Oct. 11, 1960 |
| 2,984,516 | Wilfert | May 16, 1961 |
| 2,992,851 | Barényi | July 18, 1961 |

FOREIGN PATENTS

| | | |
|---|---|---|
| 712,956 | Great Britain | Aug. 4, 1954 |
| 738,486 | Great Britain | Oct. 12, 1955 |
| 293,843 | Switzerland | Jan. 4, 1954 |
| 443,274 | Italy | Dec. 15, 1948 |
| 728,097 | Germany | Mar. 20, 1943 |